W. K. HOWE.
POLARIZED RELAY.
APPLICATION FILED MAY 19, 1909.

960,928.

Patented June 7, 1910.

WITNESSES:

INVENTOR:

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

POLARIZED RELAY.

960,923.

Specification of Letters Patent.

Patented June 7, 1910.

Application filed May 19, 1909. Serial No. 497,126.

*To all whom it may concern:*

Be it known that I, WINTHROP K. HOWE, a citizen of the United States, and resident of Rochester, in the county of Monroe and State of New York, have invented certain new and useful Improvements in Polarized Relays, of which the following is a specification.

This invention relates to polarized relays, of the type in which the armature is automatically returned to the neutral position, when the relay is deënergized, by the action of a permanent magnet upon the armature. The object of the invention is to produce a relay of this type which shall be compact in form and efficient in operation, and to this end the invention consists in the relay hereinafter described and disclosed in the accompanying drawings, as the same is defined in the succeeding claims.

Figure 1:
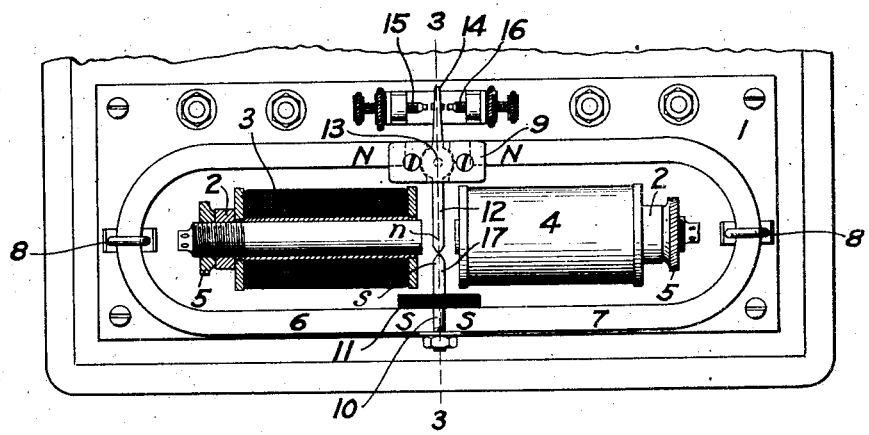
Figure 3:
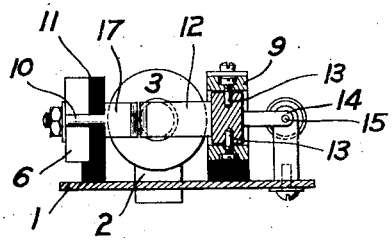
Figure 2:
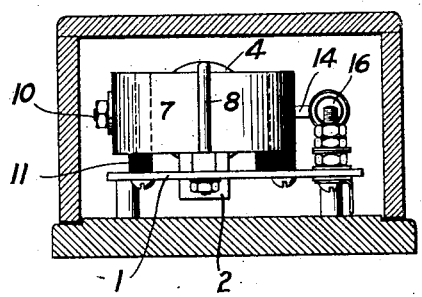

In the drawings:—Figure 1 is a top plan of a relay constructed in accordance with this invention; Fig. 2 is an elevation, viewed from the right hand end of Fig. 1; and Fig. 3 is a cross-section on the line 3—3 of Fig. 1.

The relay has a bed-plate 1, upon which are upright brackets 2 that support oppositely-placed electromagnets 3 and 4. The cores of the latter are threaded into the brackets so that they may be adjusted longitudinally, and are secured in adjusted position by nuts 5. Surrounding the electromagnets 3 and 4 are permanent magnets 6 and 7, respectively, of the horse-shoe type, that are fastened upon the bed-plate 1 by clips 8.

The permanent magnets 6 and 7 are so arranged that their like poles are abutting. The two north poles N, N, are fixed in a bracket 9, and the two south poles S, S are separated only by a stud 10, that is supported in a block 11 of nonmagnetic material.

The armature 12 is a flat bar that is pivoted on vertical bearing-points 13, 13, in the bracket 9 between the poles of the magnets 6 and 7, and is capable of movement toward the pole of either of the electromagnets. A contact arm 14 on said armature is adapted to engage either of the contact screws 15 or 16 when the armature is swung. As the armature 12 is in contact with the north poles of the permanent magnets (through the bracket 9); a north pole is induced in its inner end, as indicated at *n* in Fig. 1. The stud 10, in contact with the south poles S, S, carries a pole piece 17 that extends toward the armature 12 and nearly touches it. A south pole is therefore induced in the end *s* of said tongue, and the latter therefore has a strong attraction for the armature 12, and tends to draw said armature to its neutral position midway between the inner ends of the electromagnets 3 and 4.

If the electromagnets are energized, and the current flows in opposite directions through the coils of each, the ends of the magnet cores adjacent to the armature 12 are of opposite polarity. If the magnet 3, for instance, is so energized that the inner end of its core becomes a south pole, the magnet 4 becomes a north pole, and the armature 12 being a north pole, is repelled by the magnet 4 and attracted to the magnet 3, bringing the end 14 into contact with the screw 16. If the direction of the current is reversed, an opposite magnetization occurs, and the armature 12 is drawn toward the magnet 4 and repelled from the magnet 3, and swings about the pivots 13, bringing the end 14 into contact with the screw 15. This action may be made to control various circuits, in any well known manner.

If the magnets 3 and 4 are so energized as to be of the same polarity, an equal attraction or repulsion is exerted on each side of the armature 12, and the latter remains in the central or neutral position until one magnet or the other is deënergized. When this occurs, the armature moves toward or away from the energized magnet, depending on the polarity thereof.

As soon as both the magnets 3 and 4 are deënergized, the attraction of the pole piece 17 for the armature 12 forces the latter to return to the neutral position as shown in Fig. 1, and the device therefore is reset by the magnetic action of the permanent magnets acting on the armature and attracting it to its central or neutral position.

What I claim is:—

1. In a polarized relay, a pair of electromagnets, a pair of permanent horseshoe magnets one around each electromagnet and having their like poles adjacent, a movable armature pivoted to and magnetized by one of the magnetic poles and extending toward the other magnetic poles, and a pole piece attached to the latter magnetic pole and extending toward the armature.

2. In a polarized relay, a permanent magnet, a movable armature magnetized thereby, and two electromagnets arranged upon opposite sides of the armature and independently adjustable toward and from the armature to vary their relative effects thereon.

3. In a polarized relay, a permanent magnet, a movable armature pivoted at one end adjacent to one pole of the permanent magnet and extending toward the other pole thereof, and two electromagnets arranged on opposite sides of the armature and independently adjustable toward and from the armature to vary their relative effects thereon.

4. In a polarized relay, a pair of permanent horse shoe magnets arranged substantially in the same plane and with their like poles adjacent, a movable armature pivoted between one pair of said poles and having an arm extending into the space between the permanent magnets and a contact arm extending in the opposite direction, contact devices arranged to coöperate with said contact arm, and an electromagnet located within the permanent magnets and arranged to control the inner arm of the armature.

5. In a polarized relay, a permanent magnet, a movable armature pivoted adjacent to one pole of the permanent magnet, a pole piece attached to the other pole of the permanent magnet and extending close to the free end of the armature, and two electromagnets arranged on opposite sides of the armature and independently adjustable toward and from the armature.

WINTHROP K. HOWE.

Witnesses:
F. L. Dodgson,
W. S. Henry.